US012585361B2

(12) United States Patent (10) Patent No.: US 12,585,361 B2

Xu et al. (45) Date of Patent: Mar. 24, 2026

(54) TOUCH INPUT DEVICES

(71) Applicant: Apple Inc., Cupertino, CA (US)

(72) Inventors: Qiliang Xu, Alamo, CA (US); Ming Yu, Saratoga, CA (US); Xiaonan Wen, San Jose, CA (US); Ehsan Khajeh, Los Gatos, CA (US); Jason S. Griesbach, Sausalito, CA (US); Brian M. King, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 17/954,248

(22) Filed: Sep. 27, 2022

(65) Prior Publication Data

US 2023/0195265 A1     Jun. 22, 2023

Related U.S. Application Data

(60) Provisional application No. 63/292,968, filed on Dec. 22, 2021.

(51) Int. Cl.
G06F 3/043          (2006.01)

(52) U.S. Cl.
CPC ................................... G06F 3/043 (2013.01)

(58) Field of Classification Search
CPC .............. G06F 3/04144; G06F 3/0445; G06F 3/04166; G06F 2203/04105; G06F 2203/04108; G06F 3/043
See application file for complete search history.

(56) References Cited

U.S. PATENT DOCUMENTS

| | | | |
|---|---|---|---|
| 9,127,999 B2 | 9/2015 | Tsuruno et al. | |
| 9,501,167 B2 * | 11/2016 | Day | G06F 3/04144 |
| 9,606,606 B2 * | 3/2017 | Kitchens, II | G06F 3/041661 |
| 9,857,913 B2 * | 1/2018 | Day | G06F 3/04166 |
| 10,031,602 B2 * | 7/2018 | Kitchens, II | G06F 3/02 |
| 10,209,830 B2 * | 2/2019 | Pedder | G01L 5/00 |
| 10,235,552 B2 | 3/2019 | D'Souza et al. | |
| 10,423,265 B2 * | 9/2019 | Filiz | G06F 3/0418 |
| 10,782,818 B2 * | 9/2020 | Deng | G06F 1/1637 |
| 11,341,765 B2 * | 5/2022 | Rhee | G01L 1/162 |
| 11,442,583 B2 * | 9/2022 | Liu | H10N 30/50 |

(Continued)

OTHER PUBLICATIONS

International Search Report and Written Opinion from PCT/US2022/052317, dated Mar. 14, 2023, 12 pages.

*Primary Examiner* — Olga V Merkoulova

(74) *Attorney, Agent, or Firm* — BAKERHOSTETLER

(57) ABSTRACT

Input devices can employ ultrasonic touch sensing capabilities that allow user inputs to be detected through conductive materials, such as metal enclosures. The ultrasonic touch sensing can include generation of ultrasound signals with a piezoelectric layer. The ultrasound signals can be reflected when a user or other object is in contact with a housing, and the reflected signal can be detected by the same piezoelectric layer that produced the ultrasound signal. Such a piezoelectric layer can include a piezoelectric polymer, such as polyvinylidene fluoride (PVDF). An array of electrodes distributed on opposing sides of the use of electric layer can be operated to generate ultrasound signals and detect reflected signals. Such an input device can be operated in conjunction with a conductive (e.g., metallic) housing, conform to a variety of shapes, and be compact and lightweight.

13 Claims, 7 Drawing Sheets

(56)  References Cited

U.S. PATENT DOCUMENTS

| | | | | |
|---|---|---|---|---|
| 2014/0354905 | A1* | 12/2014 | Kitchens | G06F 3/0421 |
| | | | | 349/12 |
| 2016/0117034 | A1* | 4/2016 | Day | G06F 3/0446 |
| | | | | 345/174 |
| 2017/0052640 | A1* | 2/2017 | Day | G06F 3/04166 |
| 2017/0285877 | A1 | 10/2017 | Hinger | |
| 2017/0326590 | A1* | 11/2017 | Daneman | H10N 30/1051 |
| 2017/0330012 | A1* | 11/2017 | Salvia | G06F 1/3287 |
| 2018/0101711 | A1* | 4/2018 | D'Souza | G06V 40/1306 |
| 2018/0357457 | A1* | 12/2018 | Rasmussen | G06V 40/1306 |
| 2019/0042058 | A1 | 2/2019 | Jing et al. | |
| 2019/0056837 | A1 | 2/2019 | Datta et al. | |
| 2021/0019018 | A1 | 1/2021 | Guo et al. | |
| 2021/0223882 | A1 | 7/2021 | Ding et al. | |
| 2021/0319196 | A1* | 10/2021 | Rhee | G01L 1/16 |

* cited by examiner

TOUCH INPUT DEVICES

CROSS-REFERENCE TO RELATED APPLICATION

This application claims the benefit of U.S. Provisional Application No. 63/292,968, entitled "TOUCH INPUT DEVICES," filed Dec. 22, 2021, the entirety of which is incorporated herein by reference.

TECHNICAL FIELD

The present description relates generally to touch-based input devices, and, more particularly, to touch-based input for electronic devices.

BACKGROUND

A variety of electronic devices exist for detecting input from a user during use. A touch panel on some electronic devices may respond to touch input from a user by generating a signal that can be processed and utilized by other components of the electronic device. The signal can be used to take additional actions corresponding to the type of user input that was detected. Such inputs can act as user commands for operation of the electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
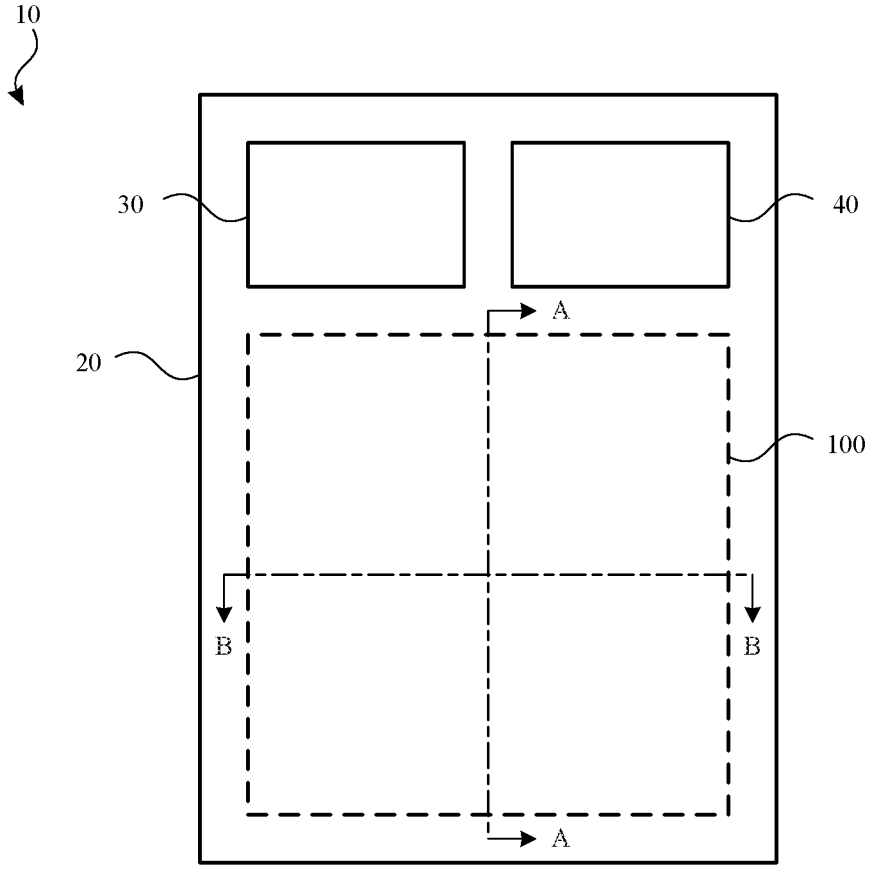
FIG. 1 illustrates a view of an electronic device, according to some embodiments of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some electronic devices that include a touch panel to receive tactile input from a user. The touch panel may include a touch sensitive surface that, in response to detecting a touch event, generates a signal that can be processed and utilized by other components of the electronic device. A user can move a finger or other object with respect to the input device, which can translate the user activity into an input command.

Some electronic devices utilize capacitive touch sensors to detect user inputs, for example by detecting an electrostatic field when the user touches or comes near such an input device. However, capacitive based touch sentencing cannot be implemented on conductive surfaces, such as metallic enclosures. Such conductive surfaces can interfere with the electrostatic field and impede detection of user inputs. As such, the application of capacitive touch sensors is limited to certain materials.

Embodiments of the present disclosure include input devices that can be implemented in electronic devices to receive user input during operation of the electronic device. The input devices can employ ultrasonic touch sensing capabilities that allow user inputs to be detected through conductive materials, such as metal enclosures. The ultrasonic touch sensing can include generation of ultrasound signals with a piezoelectric layer. The ultrasound signals can be reflected when a user or other object is in contact with a housing, and the reflected signal can be detected by the same piezoelectric layer that produced the ultrasound signal. Such a piezoelectric layer can include a piezoelectric polymer, such as polyvinylidene fluoride (PVDF). An array of electrodes distributed on opposing sides of the use of electric layer can be operated to generate ultrasound signals and detect reflected signals. Such an input device can be operated in conjunction with a conductive (e.g., metallic) housing, conform to a variety of shapes, and be compact and lightweight.

These and other embodiments are discussed below with reference to FIGS. 1-10. However, those skilled in the art will readily appreciate that the detailed description given herein with respect to these Figures is for explanatory purposes only and should not be construed as limiting.

Figure 2:
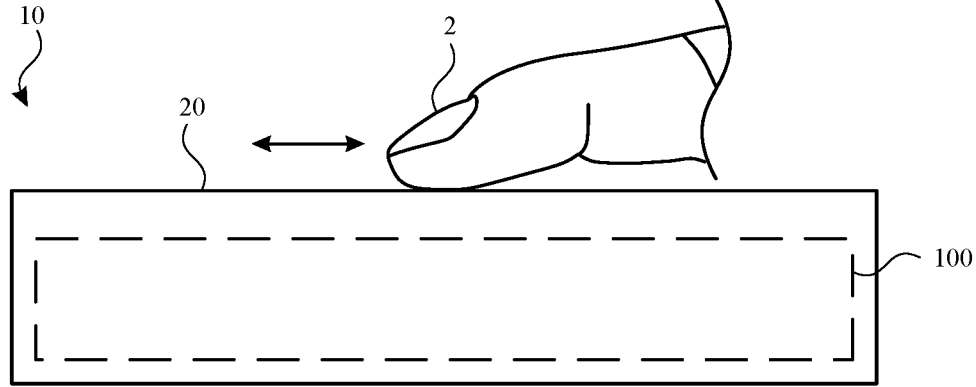
FIG. 2 illustrates a side view of the electronic device of FIG. 1 with an input device for receiving touch input from a user, according to some embodiments of the subject technology.
Figure 3:
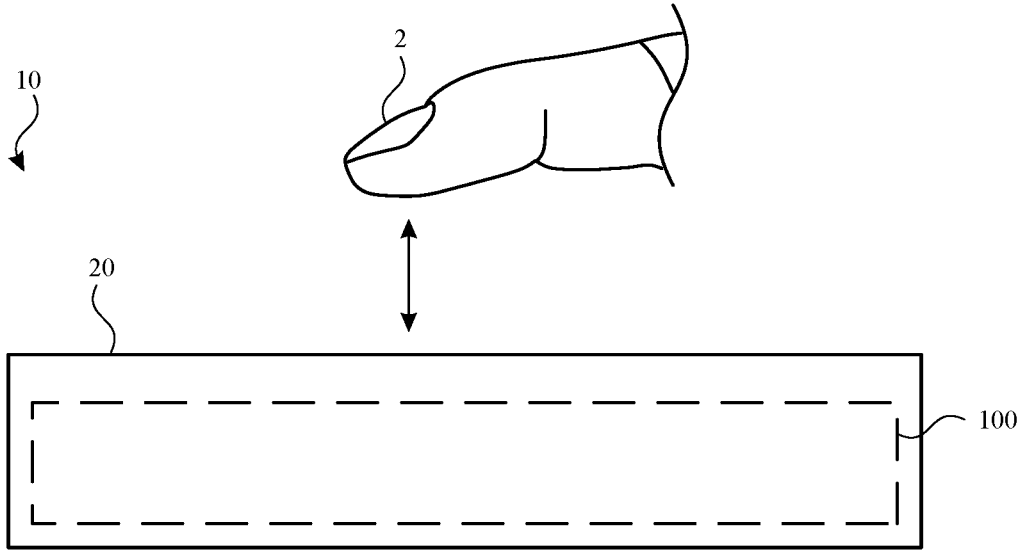
FIG. 3 illustrates a side view of the electronic device of FIG. 1 with an input device for receiving touch input from a user, according to some embodiments of the subject technology.

Referring to FIGS. 1-3, an electronic device can include an input device for receiving touch input from a user during operation of the electronic device. As shown in FIG. 1, an electronic device 10 can include a housing 20 that defines at least a portion of an outer periphery of the electronic device 10. The electronic device 10 can be any device that is operable by a user, and it will be appreciated that the subject technology can encompass and be applied to a variety of different electronic devices. For example, the electronic device 10 can be, can be part of, include, and/or be operably connected to a phone, a tablet computing device, a mobile computing device, a watch, a laptop computing device, a desktop computing device, a mouse, a trackpad, a keyboard, a game controller, a remote control, a digital media player, a wearable device, a stylus, a media player, a control panel, a display, a head-mountable device, a handheld device, a television, and the like.

The electronic device 10 can optionally include one or more input device interfaces 40 and/or output device interfaces 30. The input device interface 40 can enable a user to communicate information and select commands to the electronic device 10. Input devices may include, for example, alphanumeric keyboards, pointing devices, cameras, microphones, touchscreens, biosensors, and the like. The output device interface 30 may enable, for example, the output of information generated by electronic device 10. Output devices may include, for example, displays, speakers, haptic feedback devices, and the like. While only one input device interface 40 and one output device interface 30 are illustrated in FIG. 1, it will be understood that any number of input device interfaces and/or output device interfaces can be provided as part of an electronic device 10.

The electronic device 10 can include an input device 100 for receiving touch input at the housing 20 of the electronic device 10. The housing 20 can define at least a portion of an outer periphery of the electronic device 10. For example, the housing 20 can surround one or more internal components of the electronic device 10. While the input device 100 can be positioned alongside a portion of the housing 20 (e.g., within the housing 20), the housing 20 can optionally extend beyond the vicinity of the input device 100. The input device 100 can detect touch input provided by a user at a given portion of the housing 20. Accordingly, such a portion of the housing 20 can be considered part of the input device 100. While only one input device 100 is illustrated in FIG. 1, it will be understood that any number of input devices can be provided as part of an electronic device 10.

The input device 100 can be operated to cause the electronic device 10 to perform one or more functions. While certain examples are provided herein, it will be appreciated that any function of the electronic device 10 can be performed according to preprogrammed features of the electronic device 10.

The input device 100 can be operated to detect where and whether the user is touching the electronic device 10. The input device 100 can be operated to change, select, and/or display one or more settings of the electronic device 10. For example, the input device 100 can detect gestures and generate a signal to change, select, and/or display one or more settings and/or operations that affect performance of the electronic device 10. By further example, the input device 100 can generate a signal to alter operation of the input device interface 40 and/or the output device interface 30.

As shown in FIG. 2, the input device 100 can be operated to detect a sliding gesture by the user. Multiple sensing elements of the input device 100 along the housing 20 can be used in concert to detect particular user inputs. For example, a user 2 can apply a finger or other object at a first part of the housing 20. While fingers are illustrated in FIGS. 2 and 3, it will be understood that any portion of a body of the user 2 can be applied to the housing 20 for detection by the input device 100. Additionally or alternatively, an object other than a portion of the body of the user 2 can be applied to the housing 20 for detection by the input device 100. Such objects can include a stylus and/or other objects that can be operated by a user 2. The input device 100 of the electronic device 10 can transmit a signal (ultrasound signal) and detect the return signal that is reflected from the user 2. The user 2 can subsequently move the finger or other object to a second part of the housing 20, and the input device 100 of the electronic device 10 can transmit another signal (ultrasound signal) and detect the new return signal that is reflected from the user 2. The sequence of inputs that are detected within a span of time can be interpreted by the electronic device 10 as a user's motion gesture in a particular direction (e.g., along a surface of the housing 20). For example, the sequence of (1) a detected reflected signal in a first region and then (2) a detected reflected signal in a second region can be interpreted as a user motion gesture. Detected sliding gestures can be correlated with preprogrammed functions to be performed by the electronic device 10 upon detection of the sliding gestures.

As shown in FIG. 3, the input device 100 can be operated to detect a tap, double tap, triple tap, or another tap gesture by the user. For example, as a user applies a finger or other object at the housing 20, the electronic device 10 can detect the resulting reflected signal that is reflected from the user 2. The user 2 can subsequently lift the finger or other object, and the electronic device 10 can detect the absence of a reflected signal or change in signal strength that occurs in the absence of the finger or other object of the user 2 at the housing 20. The user 2 can subsequently return the finger or other object to the housing 20, and the electronic device 10 can detect the resulting reflected signal that is reflected from the user 2. The sequence of inputs within a span of time can be interpreted by the electronic device 10 as a user's tap gesture. Detected tap gestures can be correlated with preprogrammed functions to be performed by the electronic device 10 upon detection of the tap gestures.

While only one finger of a user 2 is shown in FIGS. 2 and 3, be understood that the input device 100 of the electronic device 10 can detect the simultaneous presence and/or absence of multiple fingers and/or other objects. Such multiple deductions can be performed by the same input device 100 and/or by multiple input devices 100. Detections of multiple fingers or other objects of the user 2 can be correlated with preprogrammed functions to be performed by the electronic device 10.

It will be appreciated that the input device 100 can be operated to detect combinations of gestures, including tap gestures, sliding gestures, and/or other gestures. For example a sequence of different gestures in combination can be interpreted by the electronic device 10 as a user's input.

Referring now to FIGS. 4-7, an input device of an electronic device can include layered components that operate to transmit and receive ultrasound signals to detect user inputs.

Figure 4:
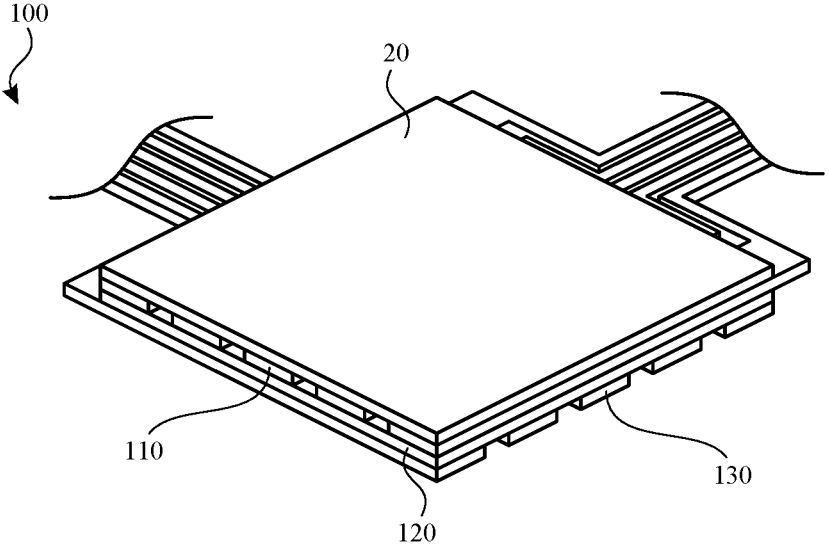
FIG. 4 illustrates a perspective view of an input device, according to some embodiments of the subject technology.

As shown in FIG. 4, an input device 100 can include a housing 20 and/or a portion of a housing 20. While the housing 20 can provide an outer surface for contact by a user, other components of the input device 100 can be provided at an inner surface of the housing. The piezoelectric layer 120 can be provided on an inner side of the housing 20. On opposing sides of the piezoelectric layer 120, multiple electrodes can be provided. For example, an upper layer 110 of electrodes can be provided between an upper side of the piezoelectric layer 120 and the housing 20. A lower layer 130 of electrodes can be provided on a lower side of the piezoelectric layer 120, opposite the upper layer 110 of electrodes.

Figure 5:
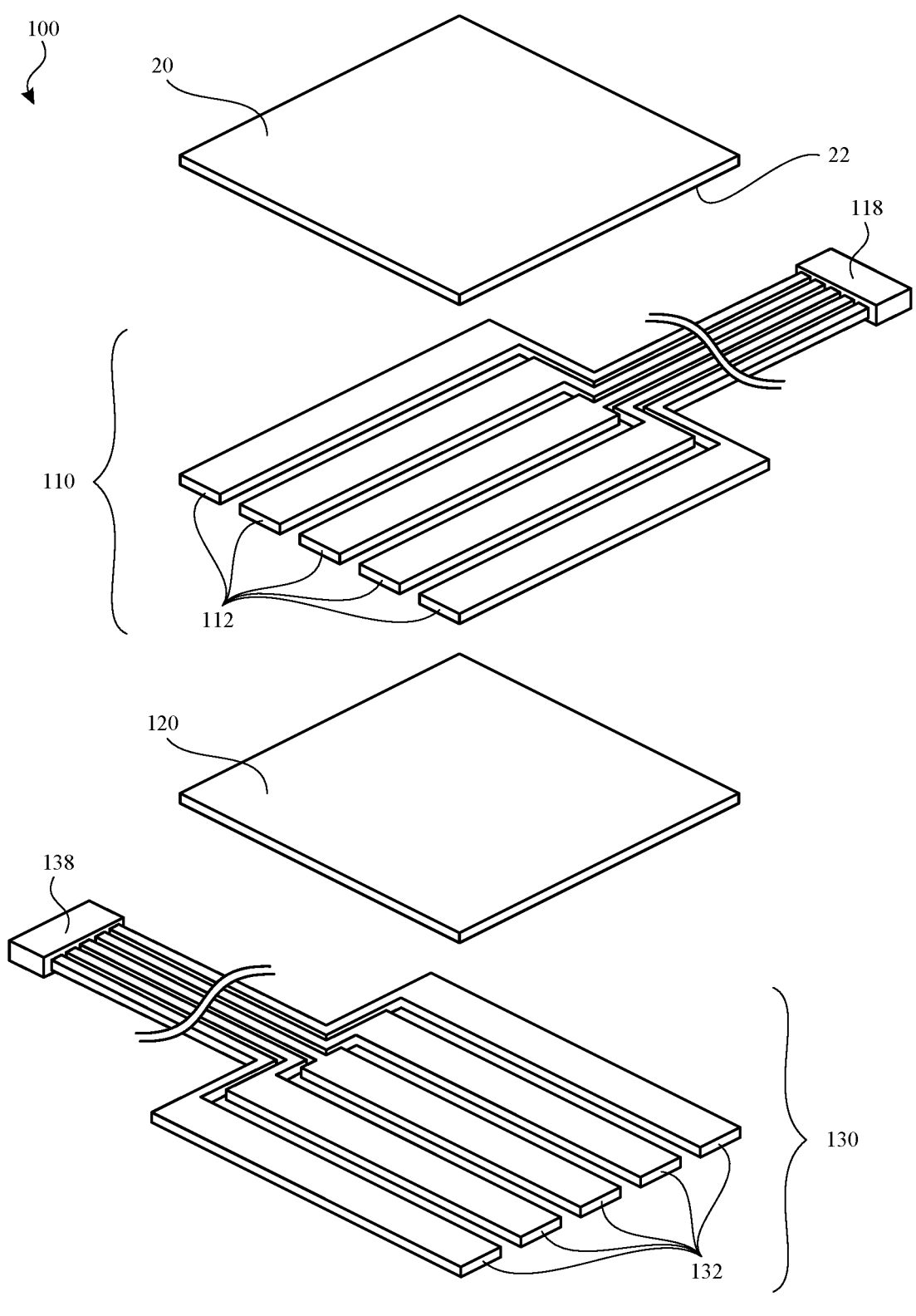
FIG. 5 illustrates an exploded perspective view of the input device of FIG. 4, according to some embodiments of the subject technology.

As shown in FIG. 5, the layers of the input device 100 can be stacked in an overlapping arrangement to detect user inputs at an external surface. The housing 20 can define the outermost surface of the input device 100. The housing 20 can be formed of a material that transmits ultrasound energy, including ultrasound signals and waves. For example, the housing 20 can include an electrically conductive metal, such as stainless steel, aluminum, titanium alloys, and the like. Additionally or alternatively, the housing 20 can include one or more other materials (e.g., plastic, polymer, etc.) that transmit ultrasound energy. The housing 20 can further include one or more liners 22 (e.g., coatings and/or other layers) to electrically isolate the housing 20 from other components of the input device 100, such as one or more electrodes of the upper layer 110.

As further shown in FIG. 5, a piezoelectric layer 120 can be provided on a side of the housing 20 and between opposing layers 110 and 130 of electrodes. The piezoelectric layer 120 can include one or more materials with piezoelectric properties. Exemplary materials include, for example, piezoelectric polymers such as polyvinylidene difluoride ("PVDF") and poly-L-lactide ("PLLA"). By further example, a piezoelectric polymers can include a poly(vinylidene fluoride-trifluoroethylene) ("PVDF-TrFE") copolymer. Where a piezoelectric polymer is selected, the piezoelectric layer 120 can have substantial flexibility to bend and conform to a variety of shapes, including curved surfaces (e.g., of the housing 20). As such, the input device 100 can be positioned against an inner side of the housing 20 regardless of its shape. Furthermore, the input device 100 can effectively detect touch inputs on a curved surface formed by the housing 20. Other materials for the piezoelectric layer 120 include potassium sodium niobate ("KNN"), aluminum nitride ("AIN"), ceramics (e.g., barium titanate, lead zirconate titanate ("PZT"), potassium niobate, sodium tungstate, zinc oxide), natural crystals (e.g., berlinite, cane sugar, quartz, Rochelle salt, topaz, and/or a tourmaline group mineral), and synthetic crystals (e.g., gallium orthophosphate and/or langasite). The piezoelectric layer 120 can extend across continuously across any area in which detection of touch input is desired. As such, the piezoelectric layer 120 can form any shape and have any surface area. The piezoelectric layer 120 can have a thickness of between about 0.01 mm to about 10 mm.

As described herein, electrodes can be positioned on opposing sides of the piezoelectric layer 120. For example, an upper layer 110 can provide one or more electrodes 112 on an upper side of the piezoelectric layer 120, and at a lower layer 130 can provide one or more electrodes 132 on a lower side of the piezoelectric layer 120. The electrodes 112 of the upper layer 110 can form rows and/or columns extending in a given direction across the piezoelectric layer 120. The electrodes 132 of the lower layer 130 can form columns and/or rows extending in a different direction across the piezoelectric layer 120. Additionally or alternatively, the electrodes 132 of the lower layer 130 and the electrodes 112 of the upper layer 110 can extend in directions that are transverse (e.g., perpendicular or orthogonal) to each other.

The piezoelectric layer 120 can extend continuously across an entirety of all of the electrodes 112 of the upper layer 110 and the electrodes 132 of the lower layer 130. For example, the piezoelectric layer 120 can optionally be a continuous sheet, rather than discrete and separate pieces. The individual regions of the piezoelectric layer 120 can be operated as individual transducers and/or probes based on electrical power that is locally applied (e.g., by selected electrodes) or induced (e.g., by reflected ultrasound signals), as described further herein.

Each of the electrodes 112 and the electrodes 132 can be conductive to receive and/or transmit electronic signals. For example, the electrodes 112 and the electrodes 132 can include metal, such as copper, silver, and the like. The electrodes 112 and the electrodes 132 can be formed onto the piezoelectric layer 120, for example by sputtering, etching, passivation, and/or bonding.

The electrodes 112 of the upper layer 110 can each be connected to an upper connector 118, and the electrodes 132 of the lower layer 130 can each be connected to a lower connector 138. The upper connector 118 and the lower connector 138 can be attached to a control board or other electronic component to control operation of the corresponding electrodes.

Figure 6:
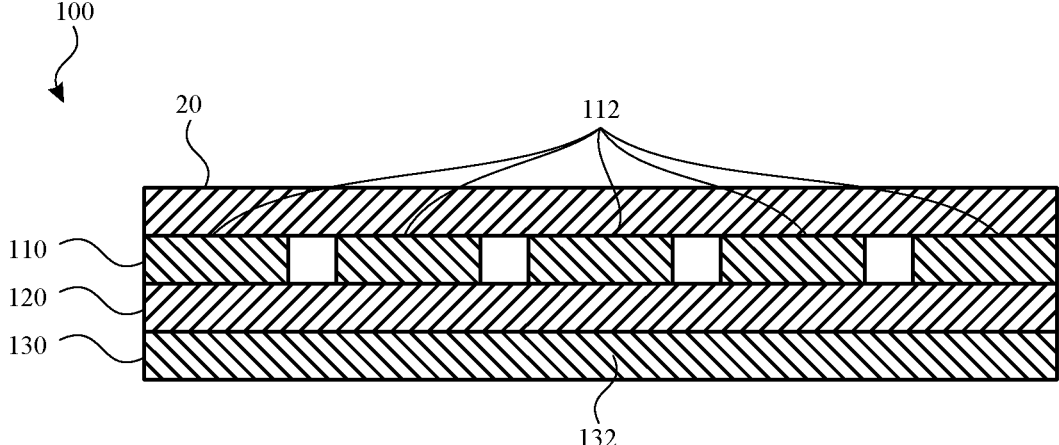
FIG. 6 illustrates a sectional view of an input device taken along line A-A of FIG. 1, according to some embodiments of the subject technology.
Figure 7:
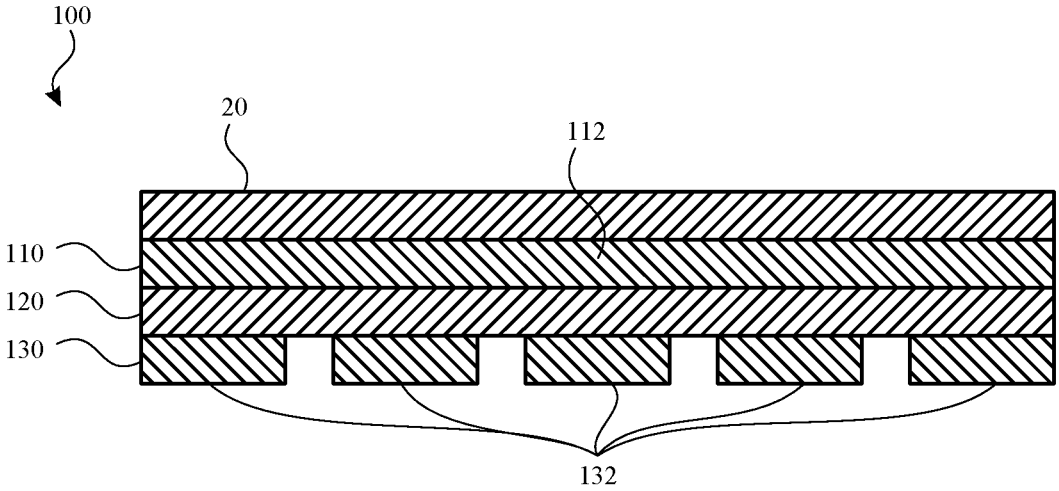
FIG. 7 illustrates another sectional view of the input device of FIG. 6 taken along line B-B of FIG. 1, according to some embodiments of the subject technology.

As shown in FIGS. 6 and 7, the arrangement of the layers can allow multiple regions to be detected by a small number of individual electrodes. For example, as shown in FIG. 6, any given electrode 132 of the lower layer 130 can extend across and/or overlap with multiple electrodes 112 of the upper layer 110. By further example, as shown in FIG. 7, any given electrode 112 of the upper layer 110 can extend across and/or overlap with multiple electrodes 132 of the lower layer 130. Each incidence of overlap can form a "pixel" that can be operated as a transducer and probe for ultrasound activity. Multiple pixels can be created by a smaller number of electrodes. For example, in the illustrated example, an array of five electrodes 112 of the upper layer 110 and five electrodes 132 of the lower layer 130 can yield an array of 25 individually operable pixels. It will be understood that any number of electrodes can be provided to produce an array of any size and resolution. For example, each layer can include 1, 2, 3, 4, 5, 6, 7, 8, 9, 10, 15, 20, 25, 30, 40, 50, or more than 50 electrodes. By providing electrodes that extend in rows and columns on opposing sides of the piezoelectric layer, the overall thickness of the upper layer and the lower layer can be reduced. For example, the entire thickness of each layer can be occupied by only one electrode, where multiple electrodes need not overlap. Furthermore, each electrode can extend outside of the region of interest of the piezoelectric layer, such that no additional lead lines are required. Rather, the electrodes themselves provide their own electrical connection to the corresponding connector.

In operation, the electrodes 112 of the upper layer 110 and the electrodes 132 of the lower layer 130 can effectively form a grid for generating ultrasound signals and receiving reflected signals at a variety of corresponding regions of the piezoelectric layer 120. For example, a given region of the piezoelectric layer 120 can be operated as a transducer by providing electrical power (e.g., electrical potential or voltage) to the electrodes 112 and 132 that are positioned on opposing sides of the given region of the piezoelectric layer 120. The electrical power can be provided in a manner that causes the piezoelectric region 122 produce an ultrasound signal (e.g., pulse and/or wave). Such an ultrasound signal can be transmitted through the housing 20 and, where applicable, to a user or other object. Any reflected signal can be transmitted back to the piezoelectric layer 120, which can react to the reflected signal by producing a corresponding electrical potential or voltage. The given region of the piezoelectric layer 120 can be operated as a probe by reading the electrical potential or voltage across the electrodes 112 and 132 that are positioned on opposing sides of the given region of the piezoelectric layer 120.

While the above description relates to transmitting and receiving signals at a given region of the piezoelectric layer, it will be understood that multiple regions can be operated as transducers and probes simultaneously or in sequence. For example, in some embodiments, different regions of the piezoelectric layer can be operated as transducers and/or probes at different times. In such embodiments, the operated electrodes can be selected based on the region of the piezoelectric layer to be operated. Such selection can include electrodes that extend across other regions of the piezoelectric layer, but which only overlap each other at the region of interest. By further example, in some embodiments, multiple regions can be operated as transducers and/or probes at the same time. In such embodiments, the operated electrodes can give readings that are correlated with regions based on the known overlap between any given pair of electrodes.

While the input device 100 illustrated herein is shown with a planar arrangement, it will be understood that a variety of other arrangements can be provided. For example, the housing 20 can form a curved surface. The other layers of the input device 100 can similarly conform to the curved surface of the housing 20. For example, the electrodes 112 of the upper layer 110, the piezoelectric layer 120, and the electrodes 132 of the lower layer 130 can each provide adequate flexibility to bend as needed to conform to the shape of the housing 20.

Figure 8:
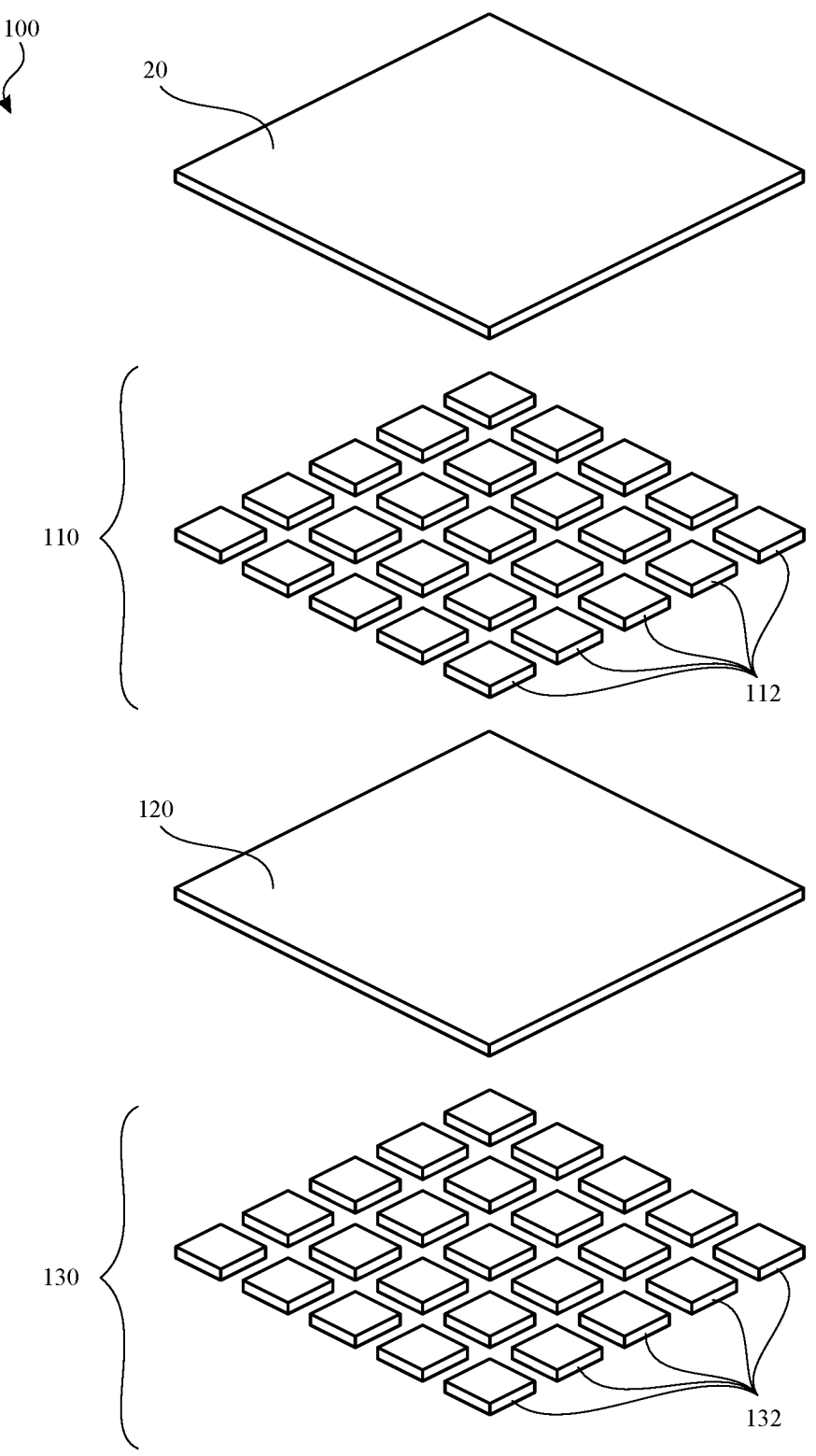
FIG. 8 illustrates an exploded perspective view of another input device, according to some embodiments of the subject technology.

Referring now to FIG. 8, in some embodiments the electrodes 112 of the upper layer 110 and the electrodes 132 of the lower layer 130 can each be individually provided to form discrete pairs on opposing sides of the piezoelectric layer 120. Each of the electrodes 112 of the upper layer 110 can be on a side of the piezoelectric layer 120 that is opposite a corresponding one of the electrodes 132 of the lower layer 130. Each pair of an electrode 112 and an electrode 132 can form a "pixel" that can be operated as a transducer and probe for ultrasound activity. Multiple pixels can be created by a corresponding number of electrode pairs. For example, in the illustrated example, an array of 25 electrodes 112 of the upper layer 110 and 25 electrodes 132 of the lower layer 130 can yield an array of 25 individually operable pixels. It will be understood that any number of electrodes can be provided to produce an array of any size and resolution. For example, each layer can include 1, 2, 3, 4, 5, 6, 7, 8, 9, 10, 15, 20, 25, 30, 40, 50, or more than 50 electrodes.

Each electrode can be operably controlled and/or monitored via lead lines (not shown) that extend, for example, to connectors or control circuitry. In such an arrangement, the pairs of electrodes 112 and 132 on opposing sides of any given region of the piezoelectric layer 120 can be powered and/or monitored to operate the given region of the piezoelectric layer 120 as a transducer and/or probe.

Figure 9:
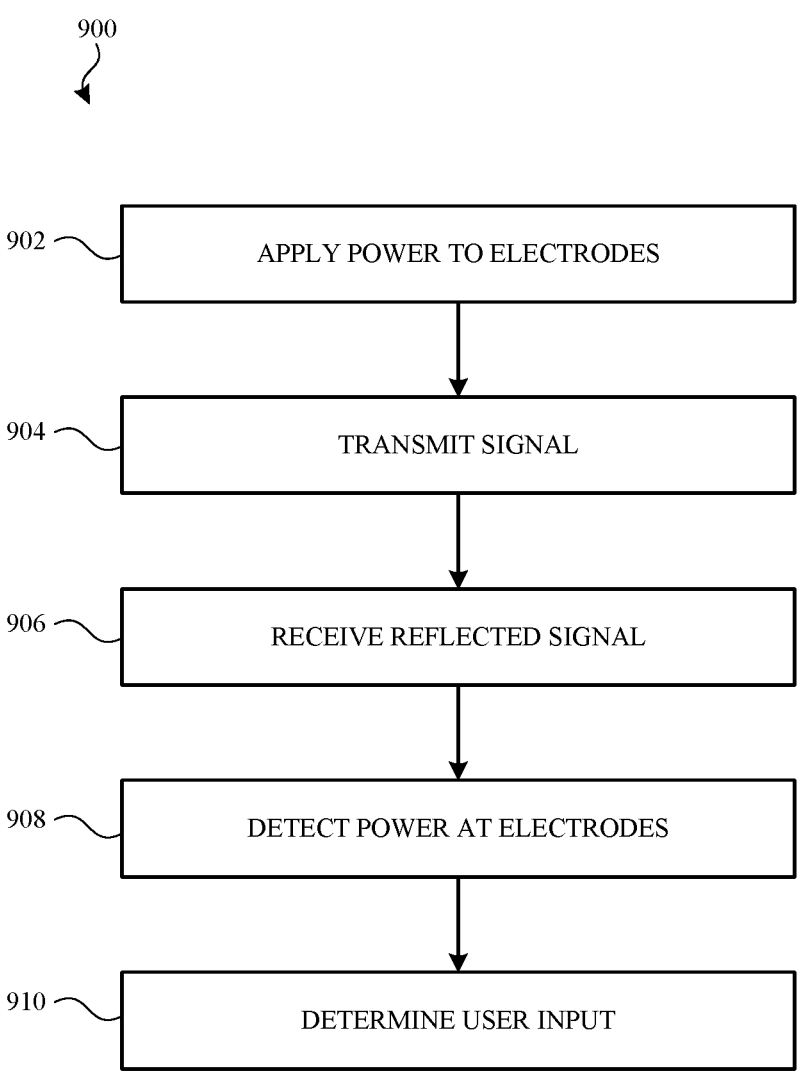
FIG. 9 illustrates a flow diagram of an example process for operating an input device, according to some embodiments of the subject technology.

FIG. 9 illustrates a flow diagram of an example process 900 for managing an input device of an electronic device. For explanatory purposes, the process 900 is primarily described herein with reference to the input devices 100 of FIGS. 1-8. However, the process 900 is not limited to the input devices 100 of FIGS. 1-8, and one or more blocks (or operations) of the process 900 may be performed by different components of the electronic device and/or one or more other devices. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The process 900 can begin when electrical power (e.g., electrical potential or voltage) is applied to a pair of electrodes (902). The pair of electrodes can be positioned on opposing sides of a given region of a piezoelectric layer. The electric power can be applied to operate the region of the piezoelectric layer as a transducer to generate an ultrasound signal (e.g., pulse and/or wave).

The ultrasound signal can be transmitted through the housing (904). Where applicable, the ultrasound signal can be transmitted to a user or other object. The ultrasound signal can interact with the user or object or otherwise propagate away from the housing and the input device.

Where the ultrasound signal interacts with a user or other object, a reflected signal can be transmitted back to the piezoelectric layer (906). The piezoelectric layer can receive the reflected signal and react by producing a corresponding electrical potential or voltage.

The given region of the piezoelectric layer can be operated as a probe by reading the electrical power (e.g., electrical potential or voltage) (908). Such a reading can be performed by electrodes that are positioned on opposing sides of the given region of the piezoelectric layer. For example, such electrodes can be the same pair to which electrical power (e.g., electrical potential or voltage) was applied.

A user input can be determined based on the detected activity of the piezoelectric layer (910). For example, the presence or absence of a reflected signal can indicate the presence or absence of a user or other object at the housing. By further example, a time of flight between the transmission of the ultrasound signal and the receipt of a reflected signal can indicate the presence or absence of a user or other object at the housing. Where multiple signals are transmitted and/or reflected and received at different times (e.g., in sequence), movement of the user or other object can be tracked to determine a gesture (e.g., sliding gesture) as a user input. Additionally or alternatively, where multiple signals are transmitted and/or reflected and received at different times (e.g., in sequence), presence and absence of the user or other object can be tracked to determine a tap as a user input. Regardless of the user input, such inputs can be correlated with operations of the electronic device, and appropriate actions can be executed based on the detection of the user input.

Figure 10:
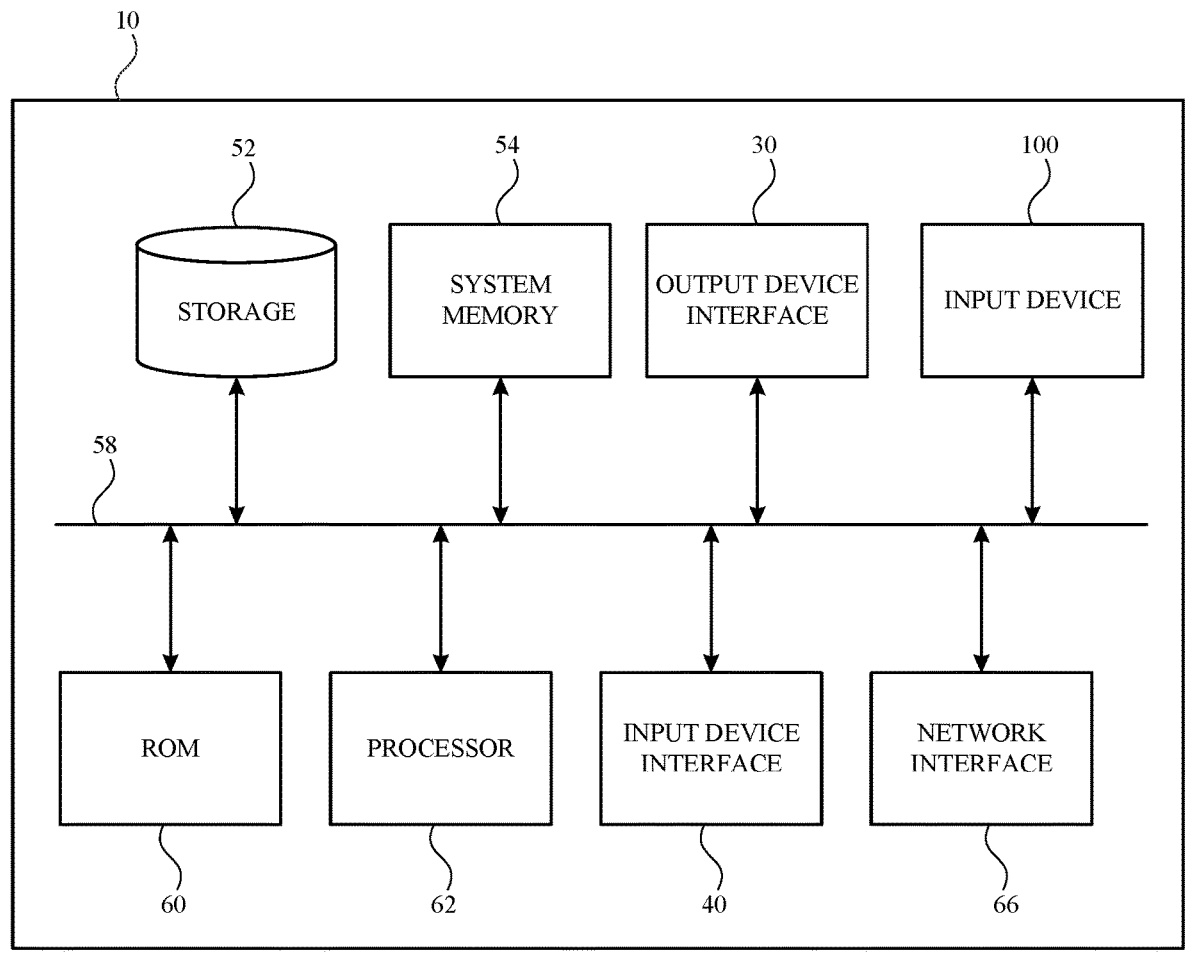
FIG. 10 conceptually illustrates an electronic device with which aspects of the subject technology may be implemented, according to some embodiments of the subject technology.

FIG. 10 conceptually illustrates an electronic device 10 with which one or more implementations of the subject technology may be implemented. The electronic device 10 can be, and/or can be a part of, the electronic device 10 shown in FIGS. 1-3. The electronic device 10 may include various types of computer readable media and interfaces for various other types of computer readable media. The electronic device 10 includes a bus 58, one or more processing unit(s) 2812, a system memory 54 (and/or buffer), a ROM 60, a permanent storage device 52, an input device interface 40, an output device interface 30, and one or more network interfaces 66, or subsets and variations thereof.

The bus 58 collectively represents all system, peripheral, and chipset buses that communicatively connect the numerous internal devices of the electronic device 10. In one or more implementations, the bus 58 communicatively connects the one or more processing unit(s) 62 with the ROM 60, the system memory 54, and the permanent storage device 52. From these various memory units, the one or more processing unit(s) 62 retrieves instructions to execute and data to process in order to execute the processes of the subject disclosure. The one or more processing unit(s) 62 can be a single processor or a multi-core processor in different implementations.

The ROM 60 stores static data and instructions that are needed by the one or more processing unit(s) 62 and other modules of the electronic device 10. The permanent storage device 52, on the other hand, may be a read-and-write memory device. The permanent storage device 52 may be a non-volatile memory unit that stores instructions and data even when the electronic device 10 is off. In one or more implementations, a mass-storage device (such as a magnetic or optical disk and its corresponding disk drive) may be used as the permanent storage device 52.

In one or more implementations, a removable storage device (such as a floppy disk, flash drive, and its corresponding disk drive) may be used as the permanent storage device 52. Like the permanent storage device 52, the system memory 54 may be a read-and-write memory device. However, unlike the permanent storage device 52, the system memory 54 may be a volatile read-and-write memory, such as random access memory. The system memory 54 may store any of the instructions and data that one or more processing unit(s) 62 may need at runtime. In one or more implementations, the processes of the subject disclosure are stored in the system memory 54, the permanent storage device 52, and/or the ROM 60. From these various memory units, the one or more processing unit(s) 62 retrieves instructions to execute and data to process in order to execute the processes of one or more implementations.

The bus 58 also connects to the input and output device interfaces 40 and 30. The input device interface 40 enables a user to communicate information and select commands to the electronic device 10. Input devices that may be used with the input device interface 40 may include, for example, alphanumeric keyboards, pointing devices (also called "cursor control devices"), cameras, microphones, touchscreens, and the like. The output device interface 30 may enable, for example, the display of images generated by electronic device 10. Output devices that may be used with the output device interface 30 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 58 also couples the electronic device 10 to one or more networks and/or to one or more network nodes through the one or more network interface(s) 66. In this manner, the electronic device 10 can be a part of a network of computers (such as a LAN, a wide area network ("WAN"), or an Intranet, or a network of networks, such as the Internet. Any or all components of the electronic device 10 can be used in conjunction with the subject disclosure.

Accordingly, embodiments of the present disclosure include input devices that can be implemented in electronic devices to receive user input during operation of the electronic device. The input devices can employ ultrasonic touch sensing capabilities that allow user inputs to be detected through conductive materials, such as metal enclosures. The ultrasonic touch sensing can include generation of ultrasound signals with a piezoelectric layer. The ultrasound signals can be reflected when a user or other object is in contact with a housing, and the reflected signal can be detected by the same piezoelectric layer that produced the ultrasound signal. Such a piezoelectric layer can include a piezoelectric polymer, such as polyvinylidene fluoride (PVDF). An array of electrodes distributed on opposing sides of the use of electric layer can be operated to generate ultrasound signals and detect reflected signals. Such an input device can be operated in conjunction with a conductive (e.g., metallic) housing, conform to a variety of shapes, and be compact and lightweight.

Various examples of aspects of the disclosure are described below as clauses for convenience. These are provided as examples, and do not limit the subject technology.

Clause A: an input device comprising: a housing comprising metal; a piezoelectric layer having an upper side and a lower side, the piezoelectric layer comprising polyvinylidene fluoride; an upper layer of electrodes between the upper side of the piezoelectric layer and the housing; and a lower layer of electrodes on the lower side of the piezoelectric layer.

Clause B: an input device comprising: a housing; a piezoelectric layer having an upper side and a lower side; upper electrodes forming rows between the upper side of the piezoelectric layer and the housing; and lower electrodes forming columns on the lower side of the piezoelectric layer, each of the columns overlapping multiple rows, and each of the rows overlapping multiple columns.

Clause C: a method comprising: applying electrical power to electrodes on opposing sides of a piezoelectric polymer layer to transmit an ultrasound signal through a metal housing; sensing electrical power at the electrodes to detect a reflected signal from outside the housing; and determining a user input based on the reflected signal.

One or more of the above clauses can include one or more of the features described below. It is noted that any of the following clauses may be combined in any combination with each other, and placed into a respective independent clause, e.g., clause A, B, or C.

Clause 1: the electrodes of the upper layer are coupled to an upper connector for operably connecting the electrodes of the upper layer to a processor; and the electrodes of the lower layer are coupled to a lower connector for operably connecting the electrodes of the lower layer to the processor.

Clause 2: the electrodes of the upper layer and the electrodes of the lower layer are operable by the processor to: apply electrical power to transmit an ultrasound signal from the piezoelectric layer and through the housing; and detect a reflected signal from outside the housing and to the piezoelectric layer.

Clause 3: the electrodes of the upper layer form rows; and the electrodes of the lower layer form columns, each of the columns overlapping multiple rows, and each of the rows overlapping multiple columns.

Clause 4: the electrodes of the upper layer are arranged in an upper grid; and the electrodes of the lower layer are arranged in a lower grid, each of the electrodes of the lower layer overlap with a corresponding one of the electrodes of the upper layer.

Clause 5: each of the rows extends in a direction that is orthogonal to a direction of each of the rows.

Clause 6: the piezoelectric layer extends continuously across each of the upper electrodes and the lower electrodes.

Clause 7: the piezoelectric layer comprises a piezoelectric polymer.

Clause 8: the piezoelectric layer comprises polyvinylidene fluoride.

Clause 9: the upper electrodes are coupled to an upper connector for operably connecting the upper electrodes to a processor; and the lower electrodes are coupled to a lower connector for operably connecting the lower electrodes to the processor.

Clause 10: determining the user input is further based on a time between a transmission of the ultrasound signal and a reception of the reflected signal.

Clause 11: the electrodes are a first pair of electrodes on opposing sides of a first region of the piezoelectric polymer layer; the ultrasound signal is a first ultrasound signal; the reflected signal is a first reflected signal; the method further comprises: applying electrical power to a second pair of electrodes on opposing sides of a second region of the piezoelectric polymer layer to transmit a second ultrasound signal through the housing; and sensing electrical power at the second pair of electrodes to detect a second reflected signal from outside the housing; and determining the user input is based on the first reflected signal and the second reflected signal.

Clause 12: the second ultrasound signal is transmitted after the first ultrasound signal.

Clause 13: the first ultrasound signal and the second ultrasound signal are transmitted simultaneously.

Clause 14: one of the electrodes of the first pair of electrodes is one of the electrodes of the second pair of electrodes.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An input device comprising:
a housing;
a piezoelectric layer having an upper side and a lower side;
an upper layer of first electrodes between the upper side of the piezoelectric layer and the housing such that the upper layer is covered by the housing, the first electrodes forming first discrete pairs and being arranged in an upper grid defining:
upper rows each including multiple ones of the first electrodes separated from each other within the corresponding one of the upper rows; and
upper columns each including multiple ones of the first electrodes separated from each other within the corresponding one of the upper columns; and
a lower layer of second electrodes on the lower side of the piezoelectric layer, the second electrodes forming second discrete pairs and being arranged in a lower grid defining:
lower rows each including multiple ones of the second electrodes separated from each other within the corresponding one of the lower rows; and
lower columns each including multiple ones of the second electrodes separated from each other within the corresponding one of the lower columns.

2. The input device of claim 1, wherein:

the first electrodes of the upper layer are coupled to an upper connector for operably connecting the first electrodes of the upper layer to a processor; and the second electrodes of the lower layer are coupled to a lower connector for operably connecting the second electrodes of the lower layer to the processor.

3. The input device of claim 2, wherein the first electrodes of the upper layer and the second electrodes of the lower layer are operable by the processor to:

apply electrical power to transmit an ultrasound signal from the piezoelectric layer and through the housing; and detect a reflected signal from outside the housing and to the piezoelectric layer.

4. The input device of claim 1, wherein the first electrodes of the upper layer are arranged in an upper grid; and the second electrodes of the lower layer are arranged in a lower grid, each of the second electrodes of the lower layer overlaps with a corresponding one of the first electrodes of the upper layer.

5. An electronic device comprising:

the input device of claim 1;

a processor;

a network interface; and an output device interface for providing output to a user.

6. The input device of claim 1, wherein:

each of the upper rows extends in a direction that is orthogonal to a direction of each of the upper columns; and each of the lower rows extends in a direction that is orthogonal to a direction of each of the lower columns.

7. The input device of claim 1, wherein each of the first electrodes is across of the piezoelectric layer from only a corresponding one of the second electrodes to form discrete pairs.

8. An input device comprising:

a housing;

a piezoelectric layer having an upper side and a lower side;

upper electrodes between the upper side of the piezoelectric layer and the housing; and lower electrodes on the lower side of the piezoelectric layer, wherein each of the upper electrodes is across of the piezoelectric layer from only a corresponding one of the lower electrodes to form discrete pairs.

9. The input device of claim 8, wherein the piezoelectric layer extends continuously across each of the upper electrodes and the lower electrodes.

10. The input device of claim 8, wherein the piezoelectric layer comprises a piezoelectric polymer.

11. The input device of claim 8, wherein the piezoelectric layer comprises polyvinylidene fluoride.

12. The input device of claim 8, wherein:

the upper electrodes are coupled to an upper connector for operably connecting the upper electrodes to a processor; and the lower electrodes are coupled to a lower connector for operably connecting the lower electrodes to the processor.

13. An electronic device comprising:

the input device of claim 8;

a processor;

a network interface; and an output device interface for providing output to a user.

* * * * *